United States Patent [19]
Probst et al.

[11] Patent Number: 4,645,817
[45] Date of Patent: Feb. 24, 1987

[54] PREPARATION OF HYDROXYL GROUP-CONTAINING ALKOXYLATION PRODUCTS OF ORGANIC CARBOXYLIC ACIDS

[75] Inventors: Joachim Probst, Leverkusen; Michael Sonntag, Odenthal; Roland Richter, Cologne; Hanns P. Müller, Odenthal, all of Fed. Rep. of Germany

[73] Assignee: Bayer Aktiengesellschaft, Leverkusen, Fed. Rep. of Germany

[21] Appl. No.: 722,567

[22] Filed: Apr. 11, 1985

[30] Foreign Application Priority Data

Apr. 26, 1984 [DE] Fed. Rep. of Germany ....... 3415531

[51] Int. Cl.$^4$ ...................... C08G 18/80; C08G 18/16; C08G 63/42; C08F 20/62
[52] U.S. Cl. .................... 528/45; 525/329.7; 525/385; 528/75; 528/76; 528/79; 528/297; 528/366
[58] Field of Search .................. 528/297, 75, 366, 45, 528/76, 79; 525/385, 329.7

[56] References Cited

U.S. PATENT DOCUMENTS

| | | | |
|---|---|---|---|
| 3,116,270 | 12/1963 | Pennino | 260/86.1 |
| 3,338,860 | 8/1967 | Vasta | 260/33.4 |
| 3,403,721 | 10/1968 | Robins et al. | 106/38.7 |
| 3,720,649 | 3/1973 | Izawa et al. | 528/366 |
| 4,131,633 | 12/1978 | Doorakian et al. | 528/366 |
| 4,210,702 | 7/1980 | Dalibor | 528/366 |
| 4,379,905 | 4/1983 | Stemmler et al. | 528/73 |
| 4,487,928 | 12/1984 | Richter et al. | 544/193 |
| 4,526,957 | 7/1985 | Matz | 528/366 |
| 4,560,788 | 12/1985 | Miyamoto et al. | 528/297 |
| 4,565,845 | 1/1986 | Inoue et al. | 528/297 |

FOREIGN PATENT DOCUMENTS

| | | |
|---|---|---|
| 590775 | 5/1960 | Canada . |
| 771569 | 4/1957 | United Kingdom . |
| 1002343 | 8/1962 | United Kingdom . |
| 940766 | 11/1963 | United Kingdom . |

Primary Examiner—Herbert S. Cockeram
Attorney, Agent, or Firm—Gene Harsh; Joseph C. Gil; Thomas W. Roy

[57] ABSTRACT

The present invention relates to a process for the preparation of alkoxylation products of organic carboxylic acids containing alcoholic hydroxyl groups by the reaction of any organic compounds containing at least one carboxyl group with alkylene oxides in an alkoxylation reaction in the presence of catalysts, characterized in that the catalysts used are phase transfer catalysts selected from the group consisting of (a) tetraalkylammonium or tetraalkylphosphonium halides in which the sum of carbon atoms of the alkyl groups is at least 8,
(b) basic alkali metal compounds converted into complexes with crown ethers and
(c) complexes of (i) basic alkali metal compounds and (ii) acyclic organic compounds containing at least 5 alkylene oxide units of the formula —R—O— (R=$C_1$-$C_4$-alkylene) in the form of one or more polyether chains having at least 3 alkylene oxide units, said compounds having a molecular weight of at least 238 and containing a total of at least 40% by weight of alkylene oxide units of the type indicated in polyether chains having at least 3 alkylene oxide units.

The present invention also relates to the use of these alkoxylation products for the production of polyurethanes by reaction with organic polyisocyanates.

10 Claims, No Drawings

PREPARATION OF HYDROXYL GROUP-CONTAINING ALKOXYLATION PRODUCTS OF ORGANIC CARBOXYLIC ACIDS

BACKGROUND OF THE INVENTION

1. Field of the Invention

This invention relates to a new process for the preparation of hydroxyl group-containing alkoxylation products of organic carboxylic acids, using special phase transfer catalysts as accelerators for the alkoxylation reaction, and to the use of the alkoxylation products as components for reaction with organic polyisocyanates in the production of polyurethanes.

2. Description of the Prior Art

It is already known that organic compounds containing carboxyl groups may be reacted with alkylene oxides such as ethylene oxide, propylene oxide or 1,2-butylene oxide in an aqueous or organic medium in the presence of basic catalysts such as tert. amines, tetraalkylammonium hydroxides, alkali metal or alkaline earth metal oxides or hydroxides or alkali metal or alkaline earth metal salts of carboxylic acids or in the presence of basic ion exchangers as catalysts to form the corresponding compounds containing hydroxyalkyl groups (see e.g. U.S. Pat. No. 3,116,270, BE-PS No. 634,310, BE-PS No. 590,775, GB-PS No. 771,569, GB-PS No. 940,766, GB-PS No. 1,002,343 or DE-OS No. 3,148,022).

When tert. amines or quaternary ammonium hydroxides are used, the alkoxylation reaction accompanied by ester formation is sharply accelerated and the degrees of conversion are significantly increased but at the same time discoloration is also found to be substantially increased. Alkali metal and alkaline earth metal oxides and hydroxides and the alkali metal and alkaline earth metal salts of carboxylic acids are in many cases unsuitable on account of their poor solubility in organic media. The use of these substances as catalysts therefore frequently results in too low a degree of esterification, i.e. the hydroxyl numbers of the reaction products are too low and their acid numbers too high, so that when they are mixed with organic polyisocyanates, for example for the preparation of two-component polyurethane lacquers, the pot life is too short owing to the acid catalysis by the carboxyl groups which are still present in a high concentration.

It was therefore an object of the present invention to provide a new process which would enable any organic compounds containing carboxyl groups to be alkoxylated without the above-mentioned disadvantages of the known art processes.

This problem may be solved by the process according to the invention described in detail below.

SUMMARY OF THE INVENTION

The present invention relates to a process for the preparation of alkoxylation products of organic carboxylic acids containing alcoholic hydroxyl groups by the reaction of any organic compounds containing at least one carboxyl group with alkylene oxides in an alkoxylation reaction in the presence of catalysts, characterized in that the catalysts used are phase transfer catalysts selected from the group consisting of (a) tetraalkylammonium or tetraalkylphosphonium halides in which the sum of carbon atoms of the alkyl groups is at least 8, (b) basic alkali metal compounds converted into complexes with crown ethers and (c) complexes of (i) basic alkali metal compounds and (ii) acyclic organic compounds containing at least 5 alkylene oxide units of the formula —R—O— (R=$C_1$–$C_4$-alkylene) in the form of one or more polyether chains having at least 3 alkylene oxide units, said compounds having a molecular weight of at least 238 and containing a total of at least 40% by weight of alkylene oxide units of the type indicated in polyether chains having at least 3 alkylene oxide units.

The present invention also relates to the use of these alkoxylation products for the production of polyurethanes by reaction with organic polyisocyanates.

DETAILED DESCRIPTION OF THE INVENTION

Any organic compounds containing at least one free carboxyl group are suitable for the process according to the invention. This means that both low molecular weight organic carboxylic acids and oligomeric or polymeric compounds containing carboxyl groups may be used for the process according to the invention.

Examples of suitable low molecular weight compounds containing carboxyl groups include aliphatic carboxylic acids having 1 to 36, preferably 1 to 18, carbon atoms which may carry alcoholic hydroxyl groups as substituents and may be olefinically unsaturated, e.g. formic acid, acetic acid, propionic acid, the isomeric butyric acids, ethyl hexanoic acid, stearic acid, lactic acid, ricinoleic acid, oleic acid, dimerized oleic acid, maleic acid, fumaric acid, adipic acid, succinic acid or citric acid; cycloaliphatic carboxylic acids having 6 to 8 carbon atoms which may contain alcoholic hydroxyl groups as substituents and/or may be olefinically unsaturated, e.g. cyclopentane carboxylic acid, cyclohexane carboxylic acid, hexahydrophthalic acid, tetrahydrophthalic acid or p-hydroxycyclohexane carboxylic acid; and aromatic carboxylic acids having 6 to 8 carbon atoms, e.g. phthalic acid, isophthalic acid, terephthalic acid or benzoic acid.

Oligomeric and polymeric carboxylic acids suitable for this purpose include polyesters and alkyd resins containing carboxyl groups which may be obtained in known manner from the polycondensation of polyhydric alcohols (optionally together with monohydric alcohols) and polybasic carboxylic acids (optionally together with monobasic carboxylic acids or their esters) These polycondensation products have been defined, for example, in Römpp's Chemielexikon, Volume 1, page 202, Franckh'sche Verlag Buchhandlung, Stuttgart (1966), and described by D.H. Solomon, The Chemistry of Organic Film-formers, pages 75–101, John Wiley and Sons, Inc., New York, (1967). The polyesters and alkyd resins with carboxyl groups suitable for the process according to the invention generally have acid numbers of about 10 to 300 mg KOH per g of substance and a molecular weight, determined as numerical average, of about 1000 to 20,000 (molecular weights up to 5000 determined by vapor pressure osmometry and molecular weights above 5000 determined by membrane osmometry).

Suitable alcohols for the preparation of the "acid" polyesters and alkyd resins include aliphatic, cycloaliphatic and/or aromatic alcohols having 1 to 6, preferably 1 to 4 OH groups attached to non-aromatic carbon atoms and 1 to 24 carbon atoms per molecule, e.g. glycols such as ethylene glycol, propylene glycol, butanediols and hexanediols; perhydrogenated bisphenols: trimethylolethane, trimethylolpropane, glycerol, pentaerythritol, mannitol and sorbitol: and monohydric chain terminating alcohols such as propanol, butanol, cyclohexanol and benzyl alcohol.

The acid components used for the synthesis of the alkyd resins or polyesters may be saturated or unsaturated aliphatic or cycloaliphatic and/or aromatic polybasic carboxylic acids, preferably di-, tri- and tetracarboxylic acids having 4 to 12 carbon atoms per molecule or derivatives thereof which are capable of esterification (e.g. anhydrides or esters), e.g. phthalic acid anhydride, isophthalic acid, terephthalic acid, tetrahydro- and hexahydro-phthalic acid anhydride, trimellitic acid anhydride, pyromellitic acid anhydride, maleic acid anhydride and adipic and succinic acid anhydride, and halogenated acids such as chlorophthalic acid and HET acid.

Monocarboxylic acids and monocarboxylic acid esters suitable for the preparation of the polyesters or alkyd resins include saturated and unsaturated aliphatic and cycloaliphatic and/or aromatic monocarboxylic acids having 6 to 24 carbon atoms per molecule such as benzoic acid, butyl benzoic acid, toluic acid, hexahydrobenzoic acid, abietic acid or lactic acid, and fatty acids and esters thereof such as linseed oil, soya bean oil, wood oil, safflower oil, castor oil, ricinene oil, cotton seed oil, ground nut oil, tall oil fatty acid, linseed oil fatty acid, the fatty acids of soya bean oil, wood oil, safflower oil and ricinene oil, and products obtained from natural, unsaturated oils or fatty acids by conjugation or isomerization. Coconut fatty acids and 2-ethylhexanoic acid are examples of suitable saturated fatty acids.

The polyesters and alkyd resins are prepared in known manner by the usual processes of condensation. This generally involves reacting the mixtures of raw materials at temperatures from 140° to 250° C. in a protective gas atmosphere, e.g. $N_2$, with elimination of water until the desired acid number has been reached.

Oligomeric and polymeric compounds containing carboxyl groups which are particularly preferred for the process according to the invention, however, are the copolymers of acrylic acid, methacrylic acid, maleic acid and derivatives thereof or copolymers of mixtures of these acids with other unsaturated monomers of the type mentioned as examples, with acid numbers from 20 to 500 and hydroxyl numbers from 0 to 130 mg of KOH per g of substance. Suitable derivatives of maleic acid include inter alia monoamides and monoesters which may be prepared by the reaction of maleic acid anhydride with amines such as ethylamine or n-butylamine or with alcohols such as ethanol or n-butanol.

Among these copolymers, it is particularly preferred to use those containing, in a copolymerized form, about 3 to 50% by weight of acrylic acid and/or methacrylic acid, about 10 to 90% by weight of styrene, methyl methacrylate, acrylonitrile and/or methacrylonitrile, about 5 to 80% by weight of alkyl acrylates having 1 to 12 carbon atoms in the alkyl group and/or alkyl methacrylates having 2 to 12 carbon atoms in the alkyl group and 0 to about 30% by weight of acrylic acid hydroxyalkyl esters and/or methacrylic acid hydroxyalkyl esters having 2 to 6 carbon atoms in the hydroxyalkyl group, the percentages mentioned above being based on the total quantity of the copolymers and adding up to 100 in each case.

These acrylate resins may be prepared by the usual processes of polymerization, preferably in solution or bulk.

The solvents used may be, for example, aromatic solvents such as benzene, toluene, xylene or chlorobenzene; esters such as ethyl acetate, butyl acetate, methyl glycol acetate, ethyl glycol acetate or methoxypropylacetate: ethers such as butyl glycol, tetrahydrofuran, dioxane or ethyl glycol ether; ketones such as acetone or methyl ethyl ketone; and halogenated solvents such as methylene chloride or trichloromonofluoroethane. If the apolar solvents mentioned above as examples have insufficient dissolving power, they are advantageously used in combination with the polar solvents mentioned above.

Preparation of the polyacrylate resins may be carried out either continuously or batchwise. If the monomer mixture and the initiator are continuously fed at a uniform rate into a polymerization reactor and the corresponding quantity of polymer is at the same time continuously removed, a steady state becomes established in the reactor after a relatively brief starting period.

A steady state may be said to exist when the concentrations of the reactants do not vary in the course of time. Under these conditions, chemically uniform copolymers can be produced. Copolymers which are chemically almost uniform may also be obtained when the reaction mixture is fed into a stirrer vessel at a constant velocity without removal of the polymer.

Suitable initiators for the preparation of the polyacrylate resins are those compounds whose half life values of radical decay at 80° to 180° C. are from 0.01 to 400 minutes. The copolymerization reaction generally takes place in the last-mentioned temperature range, preferably in the range of about 100° to 160° C, at a pressure of $10^3$ to $2 \cdot 10^4$ mbar, the exact temperature depending upon the nature of the initiator. The initiators are put into the process in quantities of about 0.05 to 6% by weight, based on the total quantity of monomers. In general, at least 98% of the monomers put into the process undergo reaction.

Examples of suitable initiators include aliphatic azo compounds such as azoisobutyronitrile, and peroxides such as dibenzoyl peroxide, tert.-butyl perpivalate, tert.-butyl per-2-ethylhexanoate, tert.-butyl perbenzoate, tert.-butyl hydroperoxide, di-tert. butyl peroxide, cumene hydroperoxide and dicyclohexyl and dibenzylperoxydicarbonate.

The usual regulators may be used to regulate the molecular weight of the acrylate resin, e.g. n-dodecylmercaptan, diisopropylxanthogen disulphide, di-(methylene-trimethylolpropane)-xanthogen disulphide and thioglycol. Thioglycol is particularly preferred on account of its hydroxyl group. The regulators are added in quantities of about 0.1 to 3% by weight, based on the monomer mixture. The monomers become incorporated in the copolymer in substantially the same proportions in which they are used for polymerization, and the polymerized units incorporated have a substantially statistical distribution. The acrylate polymers containing carboxyl groups have average molecular weights $M_{GPC}$ of about 1000 to 40,000, preferably about 3000 to 20,000, and their 40 to 80% by weight solutions in ethyl glycol acetate have a viscosity at 20° C. of about 10 to 100,000 mPa.s, depending upon the quantity of regulator added and its concentration. Furthermore, the acrylate polymers containing carboxyl groups have molecular heterogeneity indexes U of about 0.5 to 3, preferably about 0.5 to 2. The molecular heterogeneity index is defined by the equation:

$$U = (M_w/M_n) - 1$$

where $M_w$ is the weight average molecular weight, and
$M_n$ is the numerical average molecular weight.

It is known to the man of the art that products having the same average molecular weight (numerical average $M_n$) but different molecular non-uniformities have different solution viscosities. The product having the greater non-uniformity always has a higher solution viscosity since high molecular weight portions make a substantially greater contribution to the viscosity than the same quantity of low molecular weight portions. Moreover, a wide molecular weight distribution causes great differences in the number of reactive groups per molecule and hence in the reactivity of the individual chains.

The acid numbers and hydroxyl numbers of these particularly preferred starting compounds also lie within the ranges indicated above.

The alkylene oxides used for the process according to the invention may be any organic compounds containing the structural unit:

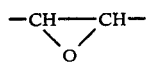

It is therefore suitable to use any compounds corresponding to the formula

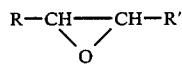

in which R and R' may be identical or different and represent hydrogen, an alkyl group having 1 to 16 carbon atoms, a cycloalkyl group having 5 to 12 carbon atoms or an aryl group having 6 to 12 carbon atoms, the said substituents optionally containing hetero atoms or functional substituents, in particular hydroxyl substituents. Examples of particularly suitable compounds include ethylene oxide, propylene oxide, 1,2-butylene oxide, 2,3-butylene oxide, styrene oxide, cyclohexene oxide, glycidol or versatic acid glycidyl ester. Ethylene oxide and propylene oxide and mixtures of these alkylene oxides are particularly preferred.

The process according to the invention is carried out in the presence of phase transfer catalysts as accelerators for the alkoxylation reaction. Phase transfer catalysts suitable for the invention include the following:

(a) any tetraalkylammonium halides and any tetraalkyl phosphonium halides in which the sum of carbon atoms of the alkyl group is at least 8, preferably 12 to 40. The corresponding chlorides, bromides and iodides are preferred, while the corresponding chlorides and bromides are particularly preferred.

The term "alkyl groups" used in this context includes not only purely aliphatic alkyl groups but also substituted alkyl groups such as aralkyl groups or cycloalkyl groups, the conditions mentioned above concerning the number of carbon atoms applying to the group as a whole. It is preferred, however, to use quaternary salts of the type mentioned above which have a maximum of one aralkyl group or cycloalkyl group in addition to three purely aliphatic alkyl groups. The corresponding purely aliphatic quaternary ammonium salts are particularly preferred.

Examples of suitable quaternary ammonium salts include tetraethylammonium iodide, tetrabutylammonium bromide, tetrabutylphosphonium bromide, methyltrioctylammonium chloride, benzyldimethyltetradecylammonium chloride, benzyltributylammonium chloride, benzyltriethylammonium chloride, cyclohexyltriethylammonium chloride, trimethylstearylammonium chloride, tetradecylammonium bromide and tetrastearylammonium chloride.

(b) Basic alkali metal complex compounds with crown ethers, as described, for example, in J. Amer. Chem. Soc. 89 (1967) on pages 7017 et seq or in DE-OS No. 3,100,262.

1:1-Complexes of (i) basic sodium or potassium compounds and (ii) 1,4,7,10,13-penta-oxacyclopentadecane ("15-crown-5") and 1,4,7,10,13,16-hexa-oxacyclooctadecane ("18-crown-6") are particularly suitable. These "1:1-complexes" are complexes of equimolar quantities of a basic sodium or potassium compound with 15-crown-5 or 18-crown-6. Complex formation of the sodium compounds is preferably carried out with the first-mentioned cyclic polyether, and complex formation of the potassium compounds is preferably carried out with the last-mentioned cyclic polyether.

The basic sodium or potassium compounds may be any compounds of the said alkali metals which in aqueous solution at a one molar concentration have a pH of at least 7.5 and in which the anion opens the oxirane ring in the desired manner.

Suitable basic compounds are, for example, sodium or potassium carboxylates, preferably having 1 to 12 carbon atoms; sodium or potassium alcoholates, preferably having 1 to 8 carbon atoms; sodium or potassium phenolates, preferably having 6 to 10 carbon atoms; and sodium or potassium carbonates and hydroxides. These include, for example, the formates, acetates, propionates, 2-ethyl-hexanoates, n-dodecanoates, caprylates, methylates, ethylates, butylates, hexylates, phenolates, tert.-butyl phenolates, carbonates and hydroxides of the abovementioned metals.

Potassium hydroxide and potassium acetate are among the preferred basic compounds.

The cyclic polyethers used for complex formation are known compounds. They may be prepared, for example, by the method according to G. Johns, C.J. Ransom, C.B. Reese, Synthesis (1976), page 515.

Preparation of the 1:1-complexes may be carried out, for example, by one of the methods described below:

1. The preparation is carried out using a solvent which may also serve as reaction medium for carrying out the polymerization and subsequent alkoxylation reaction. In that case, the cyclic polyether is dissolved in the solvent and the alkali metal salt is then introduced as solid substance with stirring so that it dissolves and complex formation takes place. Any cloudiness is removed by filtration.

2. The cyclic polyether may, of course, be dissolved in some other inert solvent, and the alkali metal salt may then be added so that it dissolves and complex formation takes place. Components (i) and (ii) are advantageously used in equimolar quantities for the preparation of the 1:1-complexes. Other proportions could, of course, be used, but either the basic alkali metal compound or the cyclic polyether would then be present in excess. It will readily be seen that such a procedure would not be advantageous since the excess of one or other component would have little or no catalytic activity. For the preparation of solutions of the 1:1-complexes, components (i) and (ii) are generally used in quantities providing solutions of the complexes at concentrations of about 0.4 to 40% by weight, preferably about 0.8 to 20% by weight. It is precisely one of the main advantages of the catalysts that they are soluble at such comparatively high concentrations in the solvents which have been mentioned above by way of example.

(c) Complexes of (i) basic alkali metal compounds of the type mentioned above and (iii) acyclic organic compounds, which compounds contain at least 5 alkylene oxide units of the formula —R—O— (R=$C_1$-$C_4$-alkylene) in the form of one or more polyether chains having at least three alkylene oxide units, contain a total of at least about 40% by weight of alkylene oxide units of the type mentioned above arranged in polyether chains having at least 3 alkylene oxide units and have a molecular weight of at least 238.

Catalyst component (iii), in contrast to the above-mentioned cyclic compounds (ii), are acyclic organic compounds which fulfill the criteria indicated above. In particular, they may be compounds which contain at least 5 alkylene oxide units of the type indicated above, preferably ethylene oxide and optionally propylene oxide units in the form of one or more polyether chains having at least 3, preferably at least 5 alkylene oxide units; contain at least about 55% by weight of alkylene oxide units of the type mentioned above within polyether chains having at least 3 alkylene oxide units; at least about 50%, preferably at least about 80% of all the alkylene oxide units present being ethylene oxide units; and the compounds having a molecular weight of from 238 to 3000, preferably from 282 to 1000. Commercial mixtures of polyethylene glycols having an average molecular weight of about 350 to 450 are particularly preferred.

Other typical examples of suitable catalyst components (iii) include monohydric to trihydric polyether alcohols conforming to these definitions, such as those which may be obtained in known manner by the alkoxylation, in particular ethoxylation, of suitable starter molecules such as monohydric alcohols, e.g. methanol, ethanol, n- or i-propanol or n-, i-, sec.- or tert.-butanol or water, or by the alkoxylation (in particular ethoxylation) of at least divalent starter molecules such as ethylene glycol, propanediol-(1,2), propanediol-(1,3), butane-, pentane- or hexanediols, glycerol, trimethylolethane or trimethylolpropane. It is also suitable to use polyethers of the type mentioned above as examples in which the hydroxyl end group(s) have been blocked e.g. by alkylation, acylation and/or urethanization so that no active hydroxyl end groups are present.

Blocking of the hydroxyl end group(s) of the polyether alcohols exemplified above by alkylation may be carried out, for example, by reacting the polyether alcohols with alkylating agents such as dimethylsulphate, $C_1$-$C_4$-alkyl halides or benzyl halide; blocking by an acylating reaction may be carried out by a reaction with acylating agents such as acetic acid anhydride, acetyl chloride or benzoyl chloride; and blocking by urethanization may be carried out by a reaction with monovalent isocyanates such as methyl, ethyl, hexyl or phenyl isocyanate. Optionally substituted methylene oxide units may be introduced into the polyethers by an acetalization of the polyether alcohols mentioned as examples with aldehydes such as formaldehyde, acetaldehyde or benzaldehyde.

To prepare these complexes which are to be used as esterification catalysts, components (i) and (iii) mentioned above as examples or any mixtures thereof are reacted together in the proportions required to provide about 1.0 to 5.0 mol, preferably about 1.0 to 2.5 mol of compound (iii) conforming to the above definitions for each gram equivalent of basic metal compound (i). If, in the preparation of the complexes, the alkoxylation products of the above-exemplified starter molecules or their derivatives constitute mixtures which, owing to the statistical nature of the alkoxylation reaction, contain not only compounds (iii) conforming to the definitions given above but also compounds which fail to conform to these definitions, for example because they contain two few alkylene oxide units, the nonconforming quantity of such mixtures are, of course, excluded from the above proportions of components (i) and (iii). The reaction between components (i) and (iii), i.e. complex formations, generally takes place spontaneously at a temperature of about 10° to 60° C., especially when components (i) and (iii) which are compatible with each other are used in the absence of solvents. Formation of the complexes may, however, be carried out in the presence of solvents or solvent mixtures of the type mentioned above as examples.

The complex potassium compounds described under (b) and (c) represent the particularly preferred accelerators used for the process according to the invention.

In the process according to the invention, the accelerators are used either as solutions in a suitable organic solvent, e.g. in aromatic solvents, esters, ethers or ketones or halogenated solvents of the type exemplified above or they are used solvent-free; in the case of the complex compounds mentioned under (b) and (c), they may also be used in the form of their individual components each of which may be dissolved in one of the solvents mentioned above, and complex formation then takes place in situ. The quantity of accelerators used generally amounts to about 0.01 to 2.0% by weight, preferably about 0.02 to 1.0% by weight, based on the quantity of organic compound containing carboxyl groups.

The process according to the invention is preferably carried out in the presence of a solvent or solvent mixture. Suitable solvents are, for example, those mentioned in connection with the preparation of acrylate resins. The alkoxylation reaction according to the invention is generally carried out at a temperature range of about 40° to 200° C., preferably about 100° to 200° C., optionally under pressure. The following procedure is generally employed for carrying out the reaction. The alkylene oxide or alkylene oxide mixture is added continuously or intermittently over a period of 0.2 to 10 hours, preferably 1 to 5 hours, to a solution, for example, a 40 to 80% by weight solution, of the organic compound containing carboxyl groups, this solution already containing the accelerator according to the invention. Thereafter, the reaction mixture is stirred for a further 2 to 15 hours, preferably 4 to 10 hours. The quantity of alkylene oxide used is preferably calculated to provide an equivalent ratio of alkylene oxide to carboxyl groups of about 0.5:1 to 2.0:1, preferably about 0.9:1 to 1.1:1.

When carrying out the process according to the invention, it is generally attempted to obtain (as much as possible) the selective esterification of the carboxyl groups by the formation of hydroxyalkylester groups, while at the same time avoiding (as much as possible) the formation of reaction products containing ether groups (by alkoxylation of hydroxyl groups), which are in most cases undesirable, as well as the formation of ester groups by a further esterification reaction between the hydroxyl groups of the incorporated hydroxyalkylester groups and the carboxyl groups present in the reaction mixture. This is achieved according to the invention by using the accelerator according to the invention at a low concentration and by adding the alkylene oxide only gradually so as to avoid excessively high local concentrations of epoxide. The process according to the invention in fact enables the carboxyl groups to be to a large extent selectively converted into hydroxyalkylester groups so that when alkylene oxides are used in equivalent quantities, based on the acid groups, as is particularly preferred, the reaction products obtained have a high hydroxyl number and low acid number.

Those products obtained by the process according to the invention which are based on the polyesters or alkyd resins with carboxyl groups mentioned above and especially those products which are based on the particularly preferred copolymers with carboxyl groups obtained by radical polymerization constitute particularly valuable reactants for organic polyisocyanates in the production of polyurethanes, in particular polyurethane lacquers, on account of their high hydroxyl group content and low carboxyl group content. Since the molecular weight of the oligomeric or polymeric starting compounds is not significantly increased by the alkoxylation reaction according to the invention, the molecular weights of the products of the process according to the invention based on oligomeric or polymeric starting materials lie within the above-mentioned ranges given for the starting materials. The hydroxyl numbers of products of the process according to the invention based on the above-mentioned oligomeric or polymeric starting compounds are generally within the range of about 20 to 250, preferably about 30 to 220 (mg KOH/g substance) and the acid numbers are in the range of about 2 to 25 (mg KOH/g substance) but it may be noted that owing to the modification according to the invention, the acid number generally amounts to less than half the acid number of the corresponding starting material. When the alkoxylating agents are used in equivalent quantities, based on the carboxyl groups present in the starting materials, which is particularly preferred according to the invention, a reduction in the acid number to less than about 10% of the starting value can generally be obtained by the process according to the invention.

Those products obtained by the process according to the invention which are based on the oligomeric or polymeric starting compounds exemplified above and particularly those based on the abovementioned copolymers of acrylic acid and/or methacrylic acid are particularly valuable starting materials for the production of polyurethanes on account of their low carboxyl group content.

The present invention therefore also relates to the use of the hydroxyl-containing alkoxylation products obtained by the process according to the invention as reactants for organic polyisocyanates, optionally blocked with blocking agents for isocyanate groups, in the production of polyurethanes.

Particularly suitable polyisocyanates for the use according to the invention are the so-called lacquer polyisocyanates known in the art, methods of preparation of which have been described, for example, in U.S. Pat. Nos. 3,124,605, 3,358,010, 3,903,126, 3,903,127, 3,976,622, 3,183,112, 3,394,111, 3,645,979 or 3,919,218 and GB-PS No. 1,060,430, GB-PS No. 1,234,972, GB-PS No. 1,506,373 or GB-PS No. 1,458,564.

These lacquer polyisocyanates are preferably polyisocyanates based on simple commercial diisocyanates such as hexamethylene diisocyanate, 2,4- and/or 2,6-diisocyanatotoluene, 2,4'- and/or 4,4'-diisocyanatodicyclohexylmethane or isophorone diisocyanate and containing biuret groups, urethane groups or isocyanurate groups.

The polyisocyanates containing biuret groups are generally reaction products of hexamethylene diisocyanate with water or compounds which split off water. They include in particular mixtures of tris-(isocyanatohexyl)-biuret with its higher homologues. These biuret polyisocyanates are the particularly preferred lacquer polyisocyanates to be used.

Polyisocyanates containing urethane groups include in particular the reaction products of 2,4-and/or 2,6-diisocyanatotoluene or isophorone diisocyanate with subequivalent quantities of polyhydric alcohols, in particular trimethylolpropane, optionally used in combination with propanediols or butanediols.

The lacquer polyisocyanates containing isocyanurate groups are preferably isocyanate-containing trimers or mixed trimers of the simple diisocyanates mentioned above as examples.

The isocyanate component could in principle be blocked with isocyanate blocking agents such as phenols, oximes such as cyclohexanone oxime, $\epsilon$-caprolactam, diethylmalonate or ethylacetoacetate before it is put into the process, in which case stoving lacquers which can be cross-linked by heat are obtained.

When the products obtained by the process according to the invention are used according to the invention, in particular when the products based on the abovementioned oligomeric or polymeric starting materials are used for the production of two-component polyurethane lacquers, the said products of the process according to the invention and the lacquer polyisocyanates mentioned above as examples are put into the process in the quantities sufficient to provide about 0.5 to 2, preferably about 0.7 to 1.3 free or blocked isocyanate groups for each hydroxyl group in the product of the process according to the invention.

When using the products according to the invention for the use according to the invention, other reactants for organic polyisocyanates known from the chemistry of polyurethane lacquers may, of course, also be used. Any of the conventional auxiliary agents and additives used in the technology of polyurethane lacquers such as solvents, levelling agents, viscosity controlling additives, matting agents, accelerators, pigments or fillers may, of course, be used in the processes employing the products according to the invention for the uses according to the invention.

When lacquer coatings are to be produced from the products obtained by the process according to the invention, any known methods of lacquer technology may be employed, e.g. spraying, spread coating, dipping, printing or roller application, and the coatings may be applied to substrates of any type, such as metals, wood, masonry, concrete, glass, ceramics, plastics, textiles or paper. The two-component polyurethane lacquers made up ready for use are distinguished by their long pot life (even when lacquer polyisocyanates with free isocyanate groups are used), rapid drying times, good levelling properties, fidelity of color and the lightfastness and excellent mechanical properties of the coatings obtained from them. The excellent diluting characteristics should be particularly mentioned, especially in the case of two-component polyurethane lacquers based on copolymers of acrylic and/or methacrylic acid which have been modified according to the invention and the lacquer polyisocyanates with aromatic hydrocarbons such as toluene or xylene mentioned above as examples.

When the lacquer polyisocyanates have free isocyanate groups, the lacquer coatings harden at about 20° to 140° C., preferably at about 20° to 60° C.; whereas, blocked polyisocyanates give rise to stoving lacquers which are hardened at about 120° to 180° C.

The following examples serve to further explain the invention. All percentages are percentages by weight unless otherwise indicated.

EXAMPLES

Example 1

192 g of citric acid (anhydrous) were dissolved in 255 g of ethyl glycol acetate at an elevated temperature. Into this solution were introduced 1.42 g of a 1:1 complex of potassium acetate/18-crown-6 (1,4,7,10,13,16-hexaoxacyclooctadecane). 191 g of propylene oxide were then added at 100°-110° C. in the course of 75 minutes. No more reflux was observed after 15 minutes' stirring (no free propylene oxide) and the 60% solution had an acid number (DIN 53 402) of 84.

When propylene oxide continued to be added to this solution at 100°-110° C. until saturation was reached, a further 78 g of propylene oxide was taken up in the course of 8 hours and a yellow solution with an acid number of 5.3 and a hydroxyl number (DIN 53 240) of 332 was obtained. The equivalent ratio of carboxyl groups to epoxide groups was 1:1.5.

EXAMPLE 2

(Comparison)

192 g of citric acid (anhydrous) were dissolved in 255 g of absolute ethyl glycol acetate at an elevated temperature. Into this solution were introduced 191 g of propylene oxide at 100°-110° C. in the course of 75 minutes. No more reflux is observed after 5 minutes (no free propylene oxide) and the 60% solution obtained has an acid number (DIN 53 402) of 135. When propylene oxide continued to be added to this solution at 100°-110° C. until saturation was reached, a further 151 g of propylene oxide were taken up in the course of 13 hours and a yellowish solution having an acid number of 20.0 and a hydroxyl number (DIN 53 420) of 317 was obtained.

Example 3

149 g (0.5 mol) of ricinoleic acid were dissolved in 149 g of ethyl glycol acetate in a threenecked flask equipped with stirrer, reflux condenser and dropping funnel, and 0.31 g of a separately prepared catalyst mixture (I) were added. The apparatus was flushed with nitrogen and the contents of the flask were heated to 100°-110° C. 37.7 g (0.65 mol) of propylene oxide were added dropwise at this temperature in the course of 90 minutes. The mixture was then stirred for a further 15.5 hours at 100°-110° C. A yellowish solution with an acid number of 8 and a hydroxyl number (DIN 53 420) of 167 (OH number calculated 170) was obtained on cooling. Equivalent ratio COOH : epoxide = 1:1.3.

Example 4

The procedure was the same as described in Example 3 except that 0.16 g of catalyst mixture (II) was used instead of catalyst mixture (I). A yellowish solution with an acid number of 16.4 and a hydroxyl number (DIN 53 240) of 169 (OH number calculated 170) was obtained after cooling.

Example 5

(Comparison)

The procedure was the same as in Example 3 except that no catalyst was used. Propylene oxide was in this case introduced dropwise over a period of 12 hours at 100°-110° C., and stirring of the reaction mixture after the addition of propylene oxide was continued for 5 hours at 100°-110° C. A light-brown solution with an acid number of 37.5 and a hydroxyl number (DIN 53 240) of 154 (OH number calculated 170) was obtained after cooling.

Preparation of catalyst solution I 6 g (0.11 mol) of potassium hydroxide were dissolved in 100 g of ethanol at room temperature. After the addition of 200 g (0.5 mol) of the dimethylether of a polyethylene glycol having an average molecular weight $Mn=400$, ethanol was distilled off in a water jet vacuum up to a sump temperature of 60° C. A clear, colorless solution having a viscosity of about 600 mPa.s at 25° C. was obtained.

Preparation of catalyst solution II 10.8 g (0.11 mol) of potassium acetate were dissolved in 100 g of ethanol at room temperature. After the addition of 100 g (0.25 mol) of a polyethylene glycol having an average molecular weight $Mn=400$, ethanol was distilled off in a water jet vacuum up to a sump temperature of 60° C. A clear, only slightly yellow solution having a viscosity of about 600 mPa.s at 25° C. was obtained.

Examples 6 to 9

(a) Preparation of an acid copolymer 6250 g of ethyl glycol acetate were introduced into a 40 liter stirrer autoclave under an atmosphere of nitrogen and heated to 140° C. While the temperature was controlled at this level, a monomer mixture of 3720 g of acrylic acid, 6000 g of styrene, 3000 g of methyl methacrylate and 1940 g of 2-ethylhexyl acrylate and an initiator mixture of 600 g of di-t-butyl peroxide and 4000 g of ethyl glycol acetate were added with exclusion of air in the course of 4 hours. The reaction mixture was then reactivated with a mixture of 30 g of di-t-butyl peroxide and 100 g of ethyl glycol acetate and left to polymerize for about 4 hours.

(b) Esterification of the acid copolymer with propylene oxide

In the examples given below, the equivalent ratio of propylene oxide to carboxyl groups was 1.05:1. The catalyst solutions listed in Table 1 were added at 140° C. to 25640 g of the approximately 60% by weight copolymer solution described under a). 3147 g of propylene oxide and 650 g of ethyl glycol acetate were then added within one hour, the reaction mixture was stirred for a further 6 hours, and residues of monomer were finally removed by distillation. The concentrations, viscosities, hydroxyl and acid numbers and color numbers are listed in Table 1.

TABLE 1

| Examples | 6 | 7 | 8 | 9 |
|---|---|---|---|---|
| Tetrabutylammonium bromide (g) | 15 | — | — | — |
| Potassium hydroxide (g) | — | 8.4 | — | — |
| Potassium acetate (g) | — | — | 14.7 | 29.4 |
| 18-crown-6 (g) | — | 39.7 | 39.7 | — |
| Polyethylene glycol ($M_n$ = 370) (g) | — | — | — | 111 |
| Ethyl glycol acetate | 1500 | 1500 | 1500 | 1500 |
| Concentration (%) | 60.9 | 60.5 | 59.8 | 60.1 |
| Viscosity at 23° C. (mPa · s) | 3100 | 2300 | 2200 | 2700 |
| Hydroxyl number (mg KOH/g solution) | 95.2 | 92.3 | 93.1 | 90.7 |
| Acid number (mg KOH/g solution) | 8.6 | 10.9 | 9.4 | 12.5 |
| Color number (iodine color scale) | 0–1 | 0 | 0 | 0 |

Examples 10 and 11

(Comparison examples)

In these comparison examples, 25640 g of the approximately 60% copolymer solution prepared according to Examples 6 to 9 were used in each case. In Example 10, 8 g of triethylamine and 1500 g of ethyl glycol acetate were added to the 25640 g of solution at 140° C. and in Example 11 the solution is left uncatalyzed. 3147 g of propylene oxide and 650 g of ethyl glycol acetate were then added in each case in the course of one hour, the reaction mixture was stirred for a further 6 hours and unreacted propylene oxide was finally removed by distillation. The results obtained are summarized in Table 2 below.

TABLE 2

| Comparison Examples | 10 | 11 |
|---|---|---|
| Concentration (%) | 59.7 | 59.5 |
| Viscosity at 23° C. (mPa · s) | 1580 | 4700 |
| Hydroxyl number (mg KOH/g solution) | 90.2 | 71.6 |
| Acid number (mg KOH/g solution) | 10.7 | 45.1 |
| Color number (iodine color scale) | 4 | 0–1 |

The following starting materials were used in Examples 12 to 14 described below.

Polyisocyanate

A 75% solution in xylene/ethyl glycol acetate (1:1) of a biuret polyisocyanate based on hexamethylene diisocyanate. The isocyanate content of the solution was 16.5%.

Acrylic resins 6–9

These are the solutions obtained according to Examples 6 to 9 (see Table 1).

The individual components were put into the process in quantities required to result in an NCO/OH equivalent ratio of 1:1.

The lacquers described in the following examples were clear lacquers having a solids content of about 40% by weight. Further dilution was carried out using a mixture of ethyl glycol acetate, xylene, ®Solvesso 100 and n-butyl acetate (proportions by weight 4:4:1:1).

Example 12

Compatibility of the acrylic resins with the polyisocyanate in two-component lacquers (diluent see above).

| Acrylic resin | 6 | 7 | 8 | 9 |
|---|---|---|---|---|
| Solution | + | + | + | + |
| Film | + | + | + | + |

Characterization of the compatibility:
+: completely compatible
—: incompatible

Example 13

Pot life and viscosities of two-component lacquers of acrylic resins and polyisocyanate (diluent, see above; addition of activator 1,4-diaza-bicyclooctane)

| Acrylic resin | 6 | 7 | 8 | 9 |
|---|---|---|---|---|
| Pot life in hours | 12 | 15 | 14 | 16 |
| Outflow time (DIN 4 cup) in seconds after | | | | |
| 0 hours | 14 | 15 | 16 | 14 |
| 4 hours | 16 | 17 | 18 | 15 |
| 8 hours | 28 | 25 | 29 | 23 |

Example 14

Flexibility and pendulum hardness of two-component lacquers of acrylic resin and polyisocyanate (addition of activator 1,4-diaza-bicyclooctane).

| Acrylic resin | 6 | 7 | 8 | 9 |
|---|---|---|---|---|
| Erichsen cupping according to DIN 53 156 after 7 days in mm | 8.5 | 8.7 | 9.2 | 8.9 |
| Pendulum hardness according to Konig in seconds according to DIN 53 157 | | | | |
| after 1 day | 78 | 69 | 65 | 82 |
| after 7 days | 110 | 162 | 147 | 145 |
| after 14 days | 145 | 165 | 161 | 158 |
| Layer thickness of film (μm) | 50 | 50 | 55 | 50 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a hydroxyl group-containing alkoxylation product of an organic carboxylic acid which comprises reacting an organic compound containing at least one carboxyl group with an alkylene oxide in an alkoxylation reaction in the presence of a phase transfer catalyst comprising a member selected from the group consisting of
   (a) tetraalkylphosphonium halides in which the sum of carbon atoms of the alkyl groups is at least 8,
   (b) basic alkali metal compounds which have undergone crown ether complex formation and (c) complexes of (i) basic alkali metal compounds and (ii) acyclic organic compounds containing at least 5 alkylene oxide units of the formula —R—O—, wherein R is $C_1$–$C_4$-alkylene, in the form of one or more polyether chains having at least three alkylene oxide units, containing a total of at least 40% by weight of alkylene oxide units within said one or more polyether chains having at least 3 alkylene oxide units and having a molecular weight of at least 238.

2. The process of claim 1 wherein said organic compound containing at least one carboxyl group is a copolymer having an acid number of about 20 to 500 and a hydroxyl number of 0 to about 130 of acrylic acid, methacrylic acid, maleic acid or derivatives thereof, or mixtures of such acids with other olefinically unsaturated monomers.

3. The process of claim 2 wherein said copolymer (i) contains, in a copolymerized form, about 3 to 50% by weight of acrylic acid and/or methacrylic acid, about 10 to 90% by weight of styrene, methyl methacrylate, acrylonitrile and/or methacrylonitrile, about 5 to 80% by weight of alkyl acrylates having 1 to 12 carbon atoms in the alkyl group and/or alkylmethacrylates having 2 to 12 carbon atoms in the alkyl group and 0 to about 30% by weight of acrylic acid hydroxyalkyl esters and/or methacrylic acid hydroxyalkyl esters having 2 to 6 carbon atoms in the hydroxyalkyl group, the above percentages being based on the total quantity of copolymers and adding up to 100, (ii) have an average molecular weight of about 1000 to 40,000 and (iii) have a moleoular heteroqeneity index U of about 0.5 to 3.0.

4. The process of claim 1 wherein the alkoxylation reaction is carried out at an equivalent ratio of alkylene oxide to carboxyl groups of about 0.5:1 to 2.0:1 at a temperature of about 40° to 200° C.

5. The process of claim 3 wherein the alkoxylation reaction is carried out at an equivalent ratio of alkylene oxide to carboxyl groups of about 0.5:1 to 2.0:1 at a temperature of about 40° to 200° C.

6. The process of claim 1 wherein said phase transfer catalyst is a potassium hydroxide, acetate, propionate or carbonate in the form of a complex with 1,4,7,10,13,16-hexa-oxacyclooctadecane or with said acyclic organic compounds having a molecular weight of 238 to 3000.

7. The process of claim 3 wherein said phase transfer catalyst is a potassium hydroxide, acetate, propionate or carbonate in the form of a complex with 1,4,7,10,13,16-hexa-oxacyclooctadecane or with said acyclic organic compounds having a molecular weight of 238 to 3000.

8. The process of claim 5 wherein said phase transfer catalyst is a potassium hydroxide, acetate, propionate or carbonate in the form of a complex with 1,4,7,10,13,16-hexa-oxacyclooctadecane or with said acyclic organic compounds having a molecular weight of 238 to 3000.

9. A process for the production of polyurethanes which comprises
(a) preparing a hydroxyl group-containing alkoxylation product of an organic carboxylic acid in accordance with claim 1 and
(b) reacting the product of step (a) with an organic polyisocyanate.

10. The process of claim 9 wherein said organic polyisocyanate is blocked with a blocking agent for isocyanate groups.

* * * * *